United States Patent
Cheng et al.

(10) Patent No.: US 7,716,508 B2
(45) Date of Patent: May 11, 2010

(54) PORTABLE ELECTRONIC APPARATUS AND METHOD FOR TIMELY RECEIVING AND DISPLAYING ELECTRONIC FILES

(75) Inventors: Hua-Dong Cheng, Guangdong (CN); Ta-Cheng Chiu, Guangdong (CN); Kuan-Hong Hsieh, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 309 days.

(21) Appl. No.: 11/309,384

(22) Filed: Aug. 3, 2006

(65) Prior Publication Data

US 2007/0075829 A1    Apr. 5, 2007

(30) Foreign Application Priority Data

Aug. 26, 2005   (CN) .................... 2005 1 0036902

(51) Int. Cl.
   *G06F 1/32* (2006.01)
(52) U.S. Cl. .................. 713/324; 713/310; 713/323
(58) Field of Classification Search ................ 713/300, 713/310, 322, 323, 324
   See application file for complete search history.

(56) References Cited

U.S. PATENT DOCUMENTS 6,341,354 B1 *   1/2002  Lee ........................... 713/324
6,535,985 B1 *   3/2003  Oshima et al. .............. 713/323
7,016,990 B1 *   3/2006  Chartier ....................... 710/62
7,231,531 B2 *   6/2007  Cupps et al. ................ 713/322
2004/0034803 A1 *   2/2004  Hamilton ..................... 713/300

FOREIGN PATENT DOCUMENTS

CN   1178127 C   12/2004
TW   517486      1/2003

* cited by examiner

*Primary Examiner*—Dennis M Butler
(74) *Attorney, Agent, or Firm*—Winston Hsu

(57) ABSTRACT

A portable electronic apparatus for timely receiving and displaying an electronic file is provided. The portable electronic apparatus is connected to a sender which transmits an electronic file to the electronic apparatus. The portable electronic apparatus includes a power unit, a receiving unit, a main part and a power controlling unit. The power unit is configured for supplying power to the portable electronic apparatus. The receiving unit is configured for timely receiving the electronic file transferred from the sender. The main part is for timely displaying the electronic file received by the receiving unit. The main part may be in either one of a "power-on" state or a "power-off" state. The power controlling unit is located between the power unit and the main part and is for resuming power supply of the main part under control of the receiving unit when the receiving unit receives the electronic file and the main part is checked in the "power-off" state, thereby enabling the main part to timely display the electronic files.

14 Claims, 3 Drawing Sheets

PORTABLE ELECTRONIC APPARATUS AND METHOD FOR TIMELY RECEIVING AND DISPLAYING ELECTRONIC FILES

FIELD OF THE INVENTION

The present invention relates generally to a portable electronic apparatus and method for receiving and displaying an electronic file to users timely.

DESCRIPTION OF RELATED ART

As computer becomes more and more important in people's daily life, people are getting accustomed to storing frequently used information in a computer digitally (i.e., electronic files). Traditionally, people used to use paper for information exchange and data transferring. Now, with the development of the network, a new way of information exchange and data transferring using network has replaced the traditional method. This new method allows important files to be transferred timely and correctly.

Currently, some portable electronic apparatuses can be used to transfer electronic files over a wireless network. However, a must satisfied condition of transferring electronic files between two portable electronic apparatuses is that both of the portable electronic apparatuses must be in a "power-on" state, namely, not only the portable electronic apparatus that sends the electronic files (hereinafter "the sender"), but also the portable electronic apparatus that receives the electronic files (hereinafter "the receiving electronic apparatus") must be powered on. If the receiving electronic apparatus is in a "power-off" state, namely, the receiving electronic apparatus is powered off, the fact that the electronic file has been sent from the sender to a recipient can not be noticed by the recipient until the receiving electronic apparatus is powered on again. Therefore, electronic files, especially important electronic files cannot reach the recipients in time.

What is still needed is a portable electronic apparatus and method which can receive and display electronic files to the recipient in time even the portable electronic apparatus is in the "power-off" state.

SUMMARY OF INVENTION

A system for receiving and displaying electronic files is provided. A preferred embodiment of the system is for receiving and displaying an electronic file sent from a sender. The system comprises a portable electronic apparatus that connects via a plurality of networks to the sender. The portable electronic apparatus comprises a power unit, a receiving unit, a main part, and a power controlling unit. The power unit is for supplying power. The receiving unit is for receiving the electronic file transmitted from the sender. The main part is for displaying the electronic file received by the receiving unit, the main part being in one of a "power-on" state and a "power-off" state. The power controlling unit interposes between the power unit and the main part, is for supplying power to the main part under control of the receiving unit when the receiving unit receives the electronic file and the main part is in the "power-off" state, thereby enables the main part to display the electronic file.

A method for timely receiving and displaying electronic files is provided. A preferred embodiment of the method comprises: providing a portable electronic apparatus connected over a plurality of networks to a sender, the portable electronic apparatus comprising a receiving unit and a main part, and the main part being in one of a "power-on" state and a "power-off" state; receiving an electronic file transmitted from the sender via the receiving unit; checking whether the main part is in the "power-off" state; supplying power to the main part under control of the receiving unit if the main part is checked in the "power-off" state; displaying the electronic file on the main part.

A portable electronic apparatus for timely receiving and displaying electronic files is provided. A preferred embodiment of the portable electronic apparatus is for receiving and displaying an electronic file sent from a sender. The portable electronic apparatus comprises a portable electronic apparatus that connects via a plurality of networks to the sender. The portable electronic apparatus comprises a power unit, a receiving unit, a main part, and a power controlling unit. The power unit is for supplying power. The receiving unit is for receiving the electronic file transmitted from the sender. The main part is for displaying the electronic file received by the receiving unit, the main part being in one of a "power-on" state and a "power-off" state. The power controlling unit interposes between the power unit and the main part, is for supplying power to the main part under control of the receiving unit when the receiving unit receives the electronic file and the main part is in the "power-off" state, thereby enables the main part to display the electronic file.

Other advantages and novel features will be drawn from the following detailed description of the preferred embodiment with reference to the attached drawings, in which:

DETAILED DESCRIPTION

Figure 1:
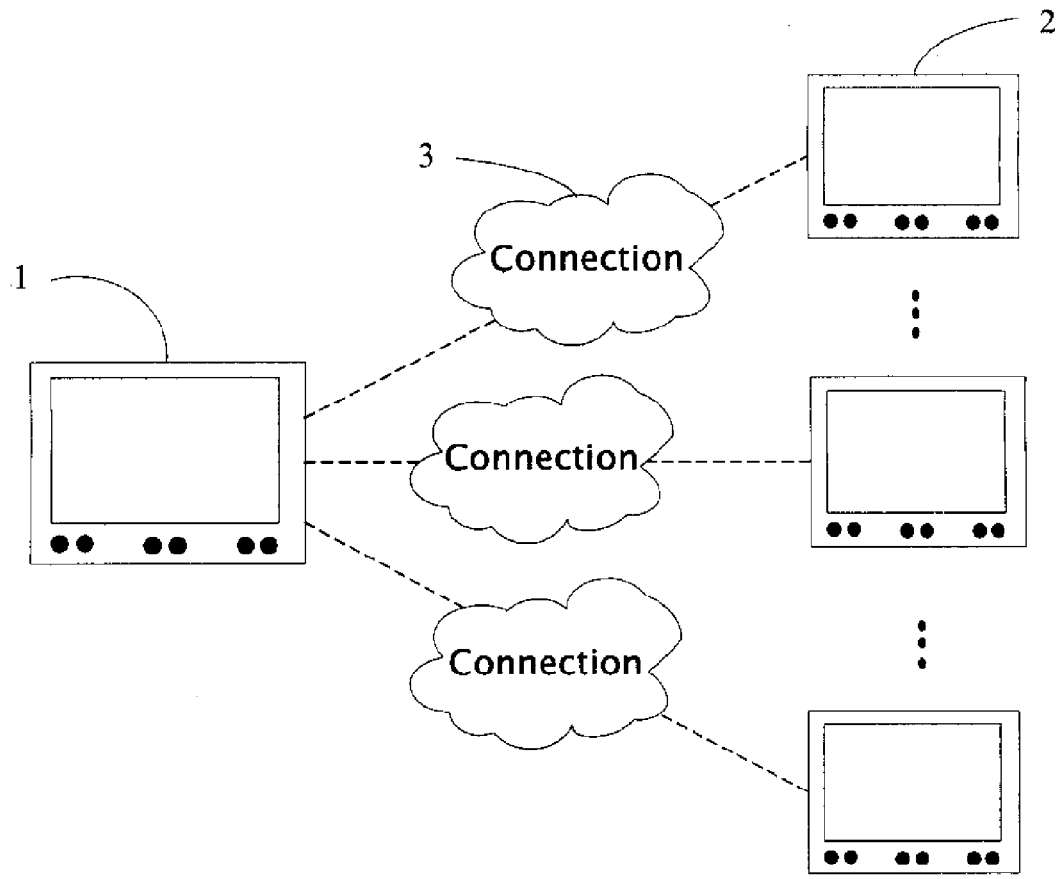
FIG. 1 is a schematic diagram of a system for timely receiving and displaying electronic files in accordance with a preferred embodiment of the present invention.

FIG. 1 is an exemplary hardware infrastructure diagram of a system for receiving and displaying electronic files timely (hereinafter "the system") of a preferred embodiment of the present invention. The system includes a sender 1, at least one portable electronic apparatus 2, and a connection 3. The sender 1 is for compressing an electronic file into a compressed electronic file, and sending the compressed electronic file to the portable electronic apparatus 2. The portable electronic apparatus 2 is for receiving the compressed electronic file transmitted from the sender 1 via the connection 3, decompressing, and displaying the compressed electronic file to recipients. The connection 3 can be a wire connection or a wireless connection.

Figure 2:
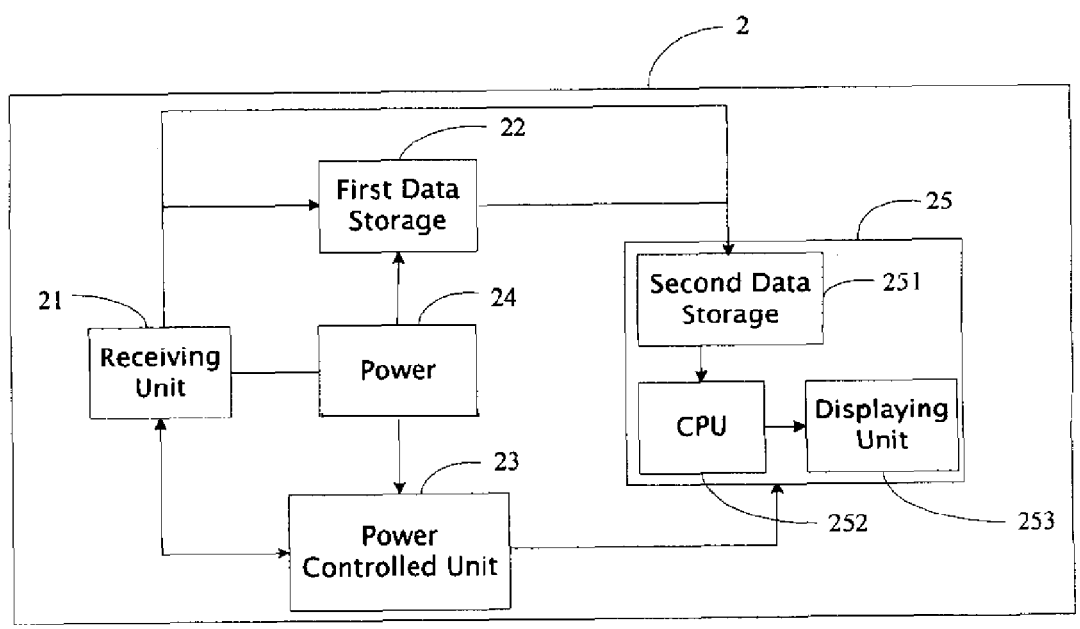
FIG. 2 is a block diagram of a portable electronic apparatus 2 of the system of FIG. 1.

FIG. 2 is a block diagram of the portable electronic apparatus 2. The portable electronic apparatus 2 includes a receiving unit 21, a first data storage 22, a power controlling unit 23, a power unit 24, and a main part 25.

The receiving unit 21 is for receiving the compressed electronic file transferred from the sender 1. The power unit 24 is for supplying power to the receiving unit 21, the first data storage 22, the power controlling unit 23, and the main part 25. The power controlling unit 23 interposed between the power unit 24 and the main part 25, and is used for controlling power supply of the main part 25 in accordance with control signals from the main part 25 or switching units (not shown) under control of the system users, thus controlling the main part 25 to be in a "power-on" state or a "power-off" state. In the preferred embodiment, the power controlling unit 23 further receives control signals from the receiving unit 21. The power controlling unit 21 receives control signals from the receiving unit 21 and provides power supply to the main part 25, thereby enabling the main part 25 when the main part 25 is in the "power-off" state. The receiving unit 21 and the first data storage 22 are configured to receive power by the power unit 24 at every predetermined time interval, thus to receive and store compressed electronic files from the sender 21 in a timely fashion.

When receiving an electronic file, the receiving unit 21 first determines from the power controlling unit 23 whether the main part 25 is in the "power-on" state or in the "power-off" state. If the main part 25 is in the "power-on" state, the receiving unit 21 transfers the compressed electronic file directly to the main part 25 to display correspondingly. If the main part 25 is in the "power-off" state, the receiving unit 21 stores the electronic file in the first data storage 22, and then sends control signals to the power controlling unit 23. The power controlling unit 23 provides power supply to the main part 25 according to the control signals, and the main part 25 is therefore in the "power-on" state. A Central Processing Unit (CPU) 252 of the main part 25 obtains the compressed electronic file from the first data storage 22, stores the compressed electronic data in a second data storage 251 in the main part 25, and further decompresses the compressed electronic file, and displays the electronic file on a display unit 253 of the main part 25.

Figure 3:
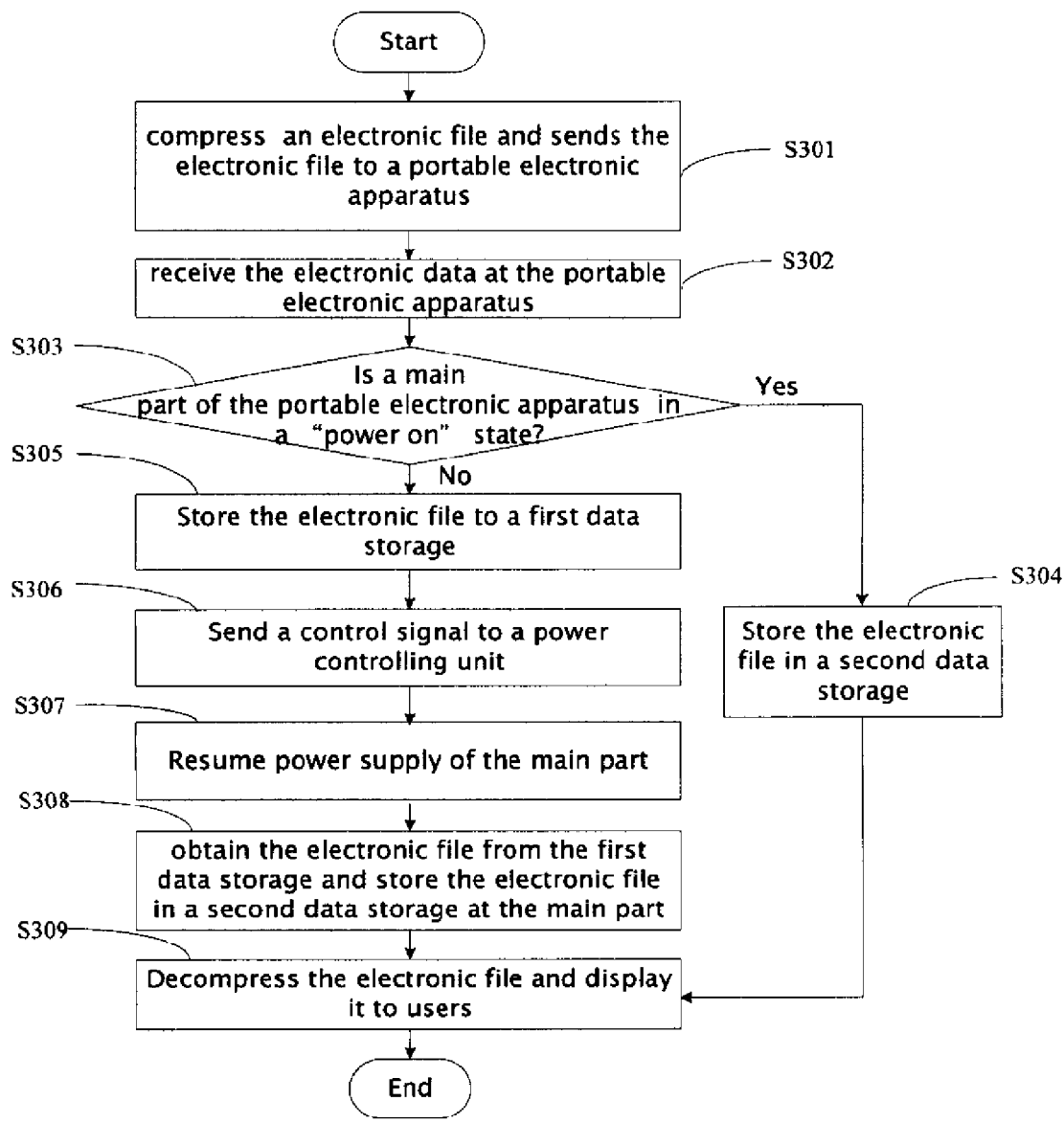
FIG. 3 is a flow chart of a preferred method for timely receiving and displaying an electronic file on the portable electronic apparatus of FIG. 2.

FIG. 3 is a flow chart of a preferred method for receiving and displaying an electronic file on the portable electronic apparatus 2 when powered off. In step S301, the sender 1 compresses the electronic file and sends the compressed electronic file to the portable electronic apparatus 2. In step S302, the receiving unit 21 receives the compressed electronic file via the connection 3.

In step S303, the portable electronic apparatus 21 determines from the power controlling unit 23 whether the main part 25 of the portable electronic apparatus 2 is in a "power-on" state or in a "power-off" state. If the main part 25 is in the "power-on" state, in the step S304, the receiving unit 21 stores the compressed electronic data in the second data storage 251 of the main part 25, and then the procedure goes directly to step S309 described later.

If the main part 25 is in the "power-off" state, in step S305, the receiving unit 21 stores the compressed electronic file in the first data storage 22. In step S306, the receiving unit 21 sends control signals to the power controlling unit 23. In step S307, the power controlling unit 23 provides the power supply to the main part 25 and the main part 25 is therefore in the "power-on" state. In step S308, the CPU 252 of the main part 25 obtains the decompressed electronic file from the first data storage 22 and stores the decompressed electronic file in the second data storage 251.

In step S309, the CPU 252 decompresses the compressed electronic file and displays the resulting electronic data to recipients via the display unit 253.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A system for receiving and displaying an electronic file sent from a sender, the system comprising:
   at least one portable electronic apparatus being connected to the sender via at least one network, the portable electronic apparatus comprising:
   a power unit for supplying power;
   a receiving unit for receiving the electronic file transmitted from the sender;
   a main part for displaying the electronic file received by the receiving unit, the main part being in one of a "power-on" state and a "power-off" state;
   a power controlling unit interposed between the power unit and the main part, for supplying power to the main part under control of the receiving unit when the receiving unit receives the electronic file and the main part is in the "power-off" state, thereby enabling the main part to display the electronic file.

2. The system as described in claim 1, wherein the portable electronic apparatus further comprises a data storage for storing the electronic file received by the receiving unit when the main part is in the "power-off" state.

3. The system as described in claim 2, wherein the receive unit and the data storage receive power from the power unit at every predetermined time interval.

4. The system as described in claim 1, wherein the at least one network is a wire network or a wireless network.

5. A method for receiving and displaying an electronic file, comprising:
   providing at least one portable electronic apparatus being connected to a sender via at least one network, the at least one portable electronic apparatus comprising a receiving unit and a main part, and the main part being in one of a "power-on" state and a "power-off" state;
   receiving an electronic file transmitted from the sender via the receiving unit;
   checking whether the main part is in the "power-off" state;
   supplying power to the main part under control of the receiving unit if the main part is checked in the "power-off" state;
   displaying the electronic file on the main part.

6. The method as described in claim 5, further comprising a step of storing the electronic file in a data storage if the main part is checked in the "power-off" state.

7. The method as described in claim 6, further comprising a step of transferring the electronic file from the data storage to the main part.

8. The method as described in claim 5, further comprising the step of displaying the electronic file on the main part if the main part is in the "power-on" state.

9. The method as described in claim 7, wherein the receiving unit and the data storage receive power from the power unit at every predetermined time interval.

10. The method as described in claim 5, wherein the at least one network is a wire network or a wireless network.

11. A portable electronic apparatus for receiving and displaying an electronic file, the portable electronic apparatus being connected to a sender via a network and comprising:
    a power unit for supplying power;
    a receiving unit for receiving the electronic files transferred from the sender;
    a main part for displaying the electronic file received by the receiving unit, the main part being in one of a "power-on" state and a "power-off" state;
    a power controlling unit interposed between the power unit and the main part, for supplying power to the main part under control of the receiving unit when the receiving unit receives the electronic file and the main part is in the "power-off" state, thereby enabling the main part to display the electronic file.

12. The apparatus as described in claim 11, wherein the portable electronic apparatus further comprises a data storage for storing the electronic file received by the receiving unit when the main part is in the "power-off" state.

13. The apparatus as described in claim 11, wherein the receiving unit and the data storage receive power from the power unit at every predetermined time interval.

14. The apparatus as described in claim 11, wherein the network is a wire network or a wireless network.

* * * * *